3,426,249
DONOR ION MODIFIED BaTiO₃ CAPACITOR AND PROCESS
Donald M. Smyth, Williamstown, Mass., assignor to Sprague Electric Company, North Adams, Mass., a corporation of Massachusetts
Filed Aug. 1, 1966, Ser. No. 569,306
U.S. Cl. 317—230                                           4 Claims
Int. Cl. H01g 9/00, 13/00, 1/00

ABSTRACT OF THE DISCLOSURE

A ceramic capacitor has a thick semiconducting zone and a thin dielectric zone adjacent at least one side thereof. The thick zone is barium titanate containing a semiconductivity-imparting-proportion of a donor ion. The thin zone is a surface region on the semiconducting zone containing additional donor ion. An electrode is affixed to the dielectric zone. The method of preparing the capacitor involves adding the semiconductivity- and nonconductivity-imparting-proportions of the donor ion to the barium titanate, firing to maturity and applying the electrode to the fired body.

---

This invention relates to ceramic capacitors and to a process for forming the same and more particularly it relates to the preparation of comparatively physically thick ceramic capacitors having extremely thin dielectric layers.

A prior art process yielding a physically thick ceramic capacitor having extremely thin dielectric layers comprises the following steps: (a) forming a dielectric titanate body by firing a green titanate body in air at a temperature of about 2450° F., (b) converting the dielectric body to a semiconducting body by firing it in a reducing atmosphere, e.g., carbon monoxide or hydrogen, at a temperature between about 2100–2300° F., (c) applying silver electrodes to opposite sides of the reduced body and firing the unit in an oxidizing atmosphere, e.g., air or oxygen to reoxidize the surface of the body beneath the electrodes. The resulting structure defines a pair of capacitors, series-connected by the semiconducting zone of the ceramic body.

This process has certain inherent disadvantages. Three separate firings are required, initial sintering, reduction and reoxidation, all requiring close control. The conductivity of the titanate increases gradually with its state of reduction (oxygen deficiency). Thus, the transition from conducting to insulating titanate in the capacitor is a gradual one, to the detriment of the dissipation factor and the temperature and frequency dependence of capacitance. Moreover, various additives to the titanate may result in the presence of separate phases whose oxidation-reduction kinetics and equilibria differ from those of the matrix.

It is an object of this invention to overcome the foregoing disadvantages of the prior art and other disadvantages which directly or indirectly result therefrom.

A further object of this invention is to produce a ceramic capacitor which possesses the advantages of the prior art capacitors without at the same time being subject to their disadvantages.

A still further object is to produce a ceramic capacitor body which has at least one extremely thin dielectric layer in intimate contact with at least one comparatively thick semiconductive layer.

Yet another object is to produce a ceramic capacitor the dielectric layer or layers of which can either be confined to any specific pattern or cover the whole of the surface of the ceramic.

These and other objects of this invention will become apparent upon consideration of the following description taken together with the accompanying drawings in which.

The ceramic capacitor in accordance with the present invention comprises a barium titanate body consisting essentially of a comparatively thick semiconducting zone having a comparatively thin dielectric zone adjacent at least one side thereof. The semiconducting zone consists of barium titanate containing a semiconductivity-imparting-proportion of a donor ion, said ion being a member of the group consisting of pentavalent and hexavalent cations having an ionic radius of between 0.5–0.8 A. and trivalent cations having an ionic radius of between about 0.9–1.6 A. The dielectric zone consists of a surface region on said semiconducting zone containing, in addition to said semiconductivity-imparting-proportion, a nonconductivity-imparting-proportion of said donor ion, said nonconductivity-imparting-proportion being greater than said semiconductivity-imparting-proportion. An electrode is affixed to each dielectric zone when there are two or more such zones. In the simple arrangement of a single dielectric zone and single semiconducting zone, an electrode is affixed to each zone. Various other electrode, dielectric and semiconducting zone combinations will be apparent to one skilled in the art.

The present invention is based upon the following: donor impurities in barium titanate may be defined as ions which have a higher positive valence than the normal ion which they replace in the latice, hence $Nb^{+5}$ or $W^{+6}$ on a $Ti^{+4}$ site or $La^{+3}$ on a $Ba^{+2}$ site. Each donor ion contributes one charge carrier (electron) if it is a single-level donor, i.e., if its valence is one unit higher than that of the ion it replaces ($Nb^{+5}$ for $Ti^{+4}$); or up to two charge carriers if it is a two-level donor, i.e., if its valence is two units higher than that of the ion it replaces ($W^{+6}$ for $Ti^{+4}$). These charge carriers are essentially free and lead to increasing conductivity with increasing donor concentration up to about a few tenths of a per cent and then further additions cause an abrupt reversal back to an insulating material. The further addition can be of the same donor or any other donor.

The transition from semiconducting back to insulating is normally accompanied by a color change from black or blue black (conducting) to another color (insulating) depending upon the particular ion involved. In many cases the color of the insulating material is white or yellow. The maximum conductivity via doping is about the same as can be obtained by reducing barium titanate and further doping yields as good an insulator as undoped barium titanate. The nonconductivity-imparting-proportion of donor ion is not a critical amount as long as the semiconductivity-imparting-proportion is exceeded. There is a practical advantage in not having to deal with a critical upper limit.

Figure 1:
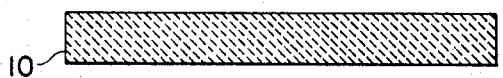
FIGURE 1 is a cross section view of an unfired disc having a semiconductivity-imparting-proportion of donor ion.
Figure 2:
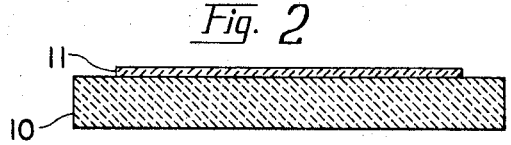
FIGURE 2 is a cross section view of the unfired disc of FIGURE 1 having a nonconductivity-imparting-proportion of donor ion deposited on the surface thereof.
Figure 3:
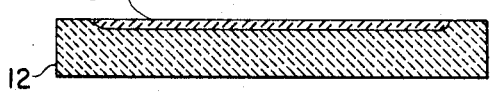
FIGURE 3 shows a cross section of the disc of FIGURE 2 after said disc has been fired to maturity.
Figure 4:
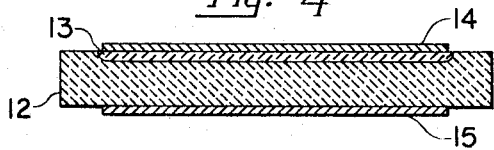
FIGURE 4 shows a cross section of the unit of FIGURE 3 electroded to form a capacitor.

Referring to the drawings, FIGURE 1 shows an unfired disc 10 containing a semiconductivity-imparting-proportion of an appropriate donor ion. FIGURE 2 shows a surface layer 11 of a nonconductivity-imparting-proportion of the same donor ion applied to disc 10. FIGURE 3 shows the disc of FIGURE 2 after it has been fired to the ceramic state. The disc then consists of a comparatively thick semiconducting zone 12 and a comparatively thin dielectric zone 13 as a surface region therein. FIGURE 4 shows electrodes 14 and 15 applied to the unit of FIGURE 3.

The invention is illustrated by the following example.

EXAMPLE

Powdered barium titanate was compounded so as to contain 0.1% by weight of $Nb_2O_5$. Six unfired pellets, 0.5 inch in diameter and 0.025 inch thick, were prepared. One surface of each pellet was covered with a thin film of niobium metal, applied by cathodic sputtering. The units were then fired in air at a temperature of about 1400° C. for a period of about 30 minutes. This operation resulted in sintering the bodies to mature ceramic pieces each consisting of a comparatively thick semiconducting zone, i.e., that containing the 0.1% $Nb_2O_5$, and a comparatively thin dielectric zone. The layer of niobium metal was converted to $Nb_2O_5$ during the sintering process and indiffused into the ceramic disc forming a dielectric surface region therein. The nonconductivity-imparting-proportion of $Nb_2O_5$ was determined to be slightly in excess of 0.2% by weight. This percentage includes the original 0.1% $Nb_2O_5$. Electrodes of air-drying silver paint were applied to opposite surfaces of the discs.

Capacitance measurements indicated that the average dielectric constant of the insulating layer was about 1500. Typical properties averaged as follows: Capacitance about 0.1 $\mu f./in.^2$; dissipation factor about 2.5–3.0%; breakdown voltage slightly in excess of 600 volts; and room temperature leakage currents of the order of $10^{-8}$ amps/$cm.^2$ at 300 volts.

Microscopic examination of a cross sectioned capacitor showed that a light colored uniform layer of about 0.002 inch thick had been formed into the surface where the niobium had been applied. The transition between conducting and nonconducting barium titanate is very sharp and the thickness of the latter layer is extremely uniform. Formation of the dielectric layer is confined solely to the area to which the additional niobium had been applied.

The nonconductivity-imparting donor ion can be introduced into the barium titanate in any manner. For example, instead of employing the pure element, which would be oxidized during sintering, it would be more practical to introduce the donor ion via an organic compound containing the ion. Certain organometallic compositions, for example, niobium resinate, tantalum resinate, etc., are commercially available. Compositions of this type can be employed to introduce the appropriate donor ion into the surface of the titanate body in the form of the metal oxide. This would be accomplished by dissolving the organometallic composition in an appropriate solvent until the proper concentration is obtained. This composition would then be applied to the surface of the titanate piece, for example, by silk screening. Thereafter, the solvent would be evaporated and during the firing of the titanate piece the organometallic compound would be decomposed to the metal oxide which will go into solid solution with the titanate. An example of an appropriate material would be the niobium resinate of nonylphenoxyacetic acid dissolved in a terpene base squeegy medium. A further example of introducing the donor ion into the ceramic is by vapor diffusion techniques.

As employed herein, a donor ion is an ion which results in bringing about N-type electrical conductivity in barium titanate as determined by Seebeck or Hall measurements. Examples of donor ions which will substitute for some of the titanium in the barium titanate latice are: $Nb^{+5}$, $Ta^{+5}$, $V^{+5}$, $Sb^{+5}$, $W^{+6}$ and $U^{+6}$. Examples of donor ions which will substitute for part of the barium in the barium titanate latice are the rare earth ions and $Y^{+3}$. An example of a donor ion which will substitute for part of the oxygen in the barium titanate latice is the $F^-$ ion. Instead of employing the same donor ion for the semiconducting and dielectric zones two different or mixtures of appropriate ions can be employed. The exact proportion of donor ion that is to be added as either the semiconductivity-imparting-proportion or the nonconductivity-imparting-proportion will vary depending upon the particular ion introduced. One skilled in the art can easily determine the optimum proportion by observation of the color change of the unit as proportions are varied and also by electrical measurements. While the specific example has illustrated the formation of a capacitor having only a single dielectric layer, it should be understood that the unit could have a dielectric layer on opposite sides thereof. Moreover, multilayer units can be formed either by making a successive buildup of semiconductor, dielectric, metal electrode or by bonding together two or more individual units. The electrode metal can be any capacitor electrode material known to the art.

Since it is obvious that many changes and modifications can be made in the above-described details without departing from the nature and spirit of the invention, it is to be understood that the invention is not limited to said details except as set forth in the appended claims.

What is claimed is:

1. A ceramic capacitor comprising a barium titanate body consisting essentially of a comparatively thick semiconducting zone having a comparatively thin dielectric zone adjacent at least one side thereof, said semiconducting zone consisting of barium titanate containing a semiconductivity-imparting-proportion of a donor ion, said ion being a member of the group consisting of pentavalent and hexavalent cations having an ionic radius between about 0.5–0.8 A. and trivalent cations having an ionic radius of between about 0.9–1.6 A.; said dielectric zone consisting of a surface region on said semiconducting zone containing, in addition to said semiconductivity-imparting-proportion, a nonconductivity-imparting-proportion of a donor ion of said group; said nonconductivity-imparting-proportion being greater than said semiconductivity-imparting-proportion; and an electrode affixed to said dielectric zone.

2. The capacitor of claim 1 wherein said donor ion is a member of the group consisting of $Nb^{+5}$, $Ta^{+5}$, $V^{+5}$, $Sb^{+5}$, $W^{+6}$, $U^{+6}$, the rare earth ions, $Y^{+3}$ and $F^-$.

3. The capacitor of claim 2 wherein said donor ion is niobium.

4. A process for preparing a ceramic capacitor comprising forming a barium titanate body containing a semiconductivity-imparting-proportion of a donor ion, said ion being a member of the group consisting of pentavalent and hexavalent cations having an ionic radius of between about 0.5–0.8 A. and trivalent cations having an ionic radius of between about 0.9–1.6 A.; applying to at least one surface of said body a nonconductivity-imparting-proportion of a donor ion of said group; said nonconductvity-imparting-proportion being greater than said semiconductivity-imparting-proportion; firing this body in air at a temperature and for a time sufficient to convert said body to a mature ceramic; and affixing an electrode to said dielectric zone.

References Cited

UNITED STATES PATENTS

| | | | |
|---|---|---|---|
| 2,962,452 | 11/1960 | Counts et al. | 252—520 |
| 3,033,907 | 5/1962 | Rue | 252—520 |
| 3,036,018 | 5/1962 | Piras | 252—520 |
| 3,268,783 | 8/1966 | Saburi | 317—230 |
| 3,274,467 | 9/1966 | Graf | 317—258 |
| 3,340,074 | 9/1967 | Herczog | 317—258 |

JAMES D. KALLAM, *Primary Examiner.*

U.S. Cl. X.R.

252—520; 317—258